United States Patent Office 3,422,668
Patented Jan. 21, 1969

3,422,668
DEVICE FOR MEASURING MECHANICAL VIBRATION
Wolf-Dieter Reutlinger, Darmstadt, Germany, assignor to Dr. Reutlinger & Sohne, Darmstadt, Germany, a German firm
Filed May 31, 1967, Ser. No. 642,443
Claims priority, application Germany, June 3, 1966, R 43,404
U.S. Cl. 73—71.4      8 Claims
Int. Cl. G01n 33/00

ABSTRACT OF THE DISCLOSURE

The invention picks up mechanical vibration, which vibration varies the magnetic field of a Hall-effect voltage generator excited by AC of selectively variable frequency to give a maximum DC output when in phase synchronism between the field and current is obtained. A phase shifter may be interposed in the exciting current circuit. Varying of the exciter frequency to match that of change in magnetic field and shifting the phase of the current enables the output voltage to have meaning in studying the vibration. Phase angles between various moving parts of machinery may be determined and the measurements may be relative to various angular components.

BACKGROUND OF THE INVENTION

*Field of the invention*

In arrangements for measuring mechanical vibration or oscillation it is known to provide mechanical take-offs or pickups which convert the mechanical measured amount into an analogous electrical value. An electric measuring instrument or recorder is connected to this pickup and, if necessary, an amplifier is interposed between.

Since vibrational behavior of objects under study, for example, machines, often occurs as complex or mixed oscillation, that is to say oscillation of a system having several degrees of freedom; the analysis of such mixed oscillation is of especial practical use. Such an analysis of oscillation with respect to frequency and amplitude of particular or isolated components of oscillation is often based on the principle of the interference, when a reference frequency is known.

For the carrying out of such analyses of vibration by electrical means there have been several different devices developed.

*Description of prior art*

A known apparatus is composed of a low-frequency tuned moving coil pickup with a subsequent frequency-selective alternating current voltage amplifier, for which the frequency to give the maximum amplification can be varied over a wide range by hand or by servotuning. For such a selective frequency variation there are employed as frequency determining elements, a double T resistance and capacitance network which is connected in the counter coupling branch of the measuring amplifier, whereby the tuning of the frequency is obtained by continually varying the resistance and capacitance of parts in the network. Such an apparatus does have the advantage of relatively constant band width as compared with a tuned system but it has, however, the drawback that results from the same difficulties of setting the tuning element and so the band width often cannot be held adequately narrow. Because of this it is not possible under many circumstances to separate two frequently occurring moderately narrow and closely lying vibration components from one another. Besides, the damping out of harmonics is not often possible with such filters. A further difficulty often met with in the commercial production of such instruments is the objectional time-consuming adjustment which must be undertaken with very great care, in order that the amplitude measurement error of such apparatus remain relatively small.

Other vibration analysers operate on the so-called differentiations principle, but they have limited range, and vibration study of mechanical devices must be over a wide range.

Wattmeters excited by a variable but known frequency AC comparison generator and which has the voltage input corresponding to vibration under study have been used, and they are good at low frequencies. However the reactance of the rotary coil of the wattmeter and the iron of the stator limit use to low frequencies.

Besides that, the energy requirement for the field excitation of the wattmeter is relatively large so that the comparison generator must have a high power output. Providing such a generator is not only costly in itself but it is costly to provide for the stabilization of the exciter current, which is preferably of great power and low frequency, and these conditions present difficulties.

In order to minimize the drawback it was then proposed to use no wattmeter of conventional construction but rather an electronic wattmeter by which the mixed oscillation or vibration is dealt with by the sine wave alternation voltage of the comparison generator in the through line amplifier intermediate the vibration pickup and the indicating instrument. Such circuits are known to take many forms. However in all these circuits and systems there is the difficulty to be able to cover large zones of frequency. It is therefore necessary that a relatively larger electronic input is required. Hence such an instrument is not only expensive but requires the use of a multitude of components which in certain sizes are not reliable.

SUMMARY OF THE INVENTION

The present invention minimizes the drawbacks of the prior art. As in the prior art, the invention includes means for the measuring of mechanical vibration comprising an oscillatory pickup which converts the mechanically measured amount into an electrical quantity, a meter or recorder for the electrical quantity, and electric comparison generator with an adjustable comparison frequency for carrying out of vibration analysis according to the multiplicative superimposing process. The novelty of invention is especially characterized by the use of a vibration pickup having an electrically separate excitation, the comparison generator supplying the excitation, and the meter or recorder for the electrical values is an exclusively DC measuring instrument. By means of the feed from the separate excitation by the comparison generator the condition is attained so that the multiplicative superimposing takes place in the vibration pickup itself. Due to this the objections which are present in both the wattmeter methods described of the prior art are minimized. Since the delivered output from the vibration pickup is proportionately small it presents no difficulties, at high frequencies, to develop the multiplication without disturbing effects. The delivered output from the comparison generator is also not so large that the measurement becomes difficult. The delivered output quantities from the vibration pickup can be amplified and led directly without further evaluation to a conventional indicator or recorder.

Special advantages are obtained when the Hall effect is used in the vibration pickup to produce a voltage. Such pickups are well known to the art and are described in German Patent 1,125,666. In the type of pickup a Hall voltage element and a magnetic field are inductive relative to each other and either the Hall voltage element or the magnetic field, i.e., the magnet, forms a part of the system adapted to be vibrated. Accordingly a further feature of the invention is that control current used for the Hall voltage producer is not the usual DC but current led from a comparison generator producing alternating current of adjustable frequency. Therefore the Hall voltage becomes equal to the value resulting from the mechanical oscillatory influence times that of the control exciter current for the Hall voltage producer times the sine or cosine of the phase angle between the two. From that it follows that a constant Hall voltage output is delivered if the frequency of the control current of the Hall voltage producer and the frequency of the oscillatory system are equal. With that, the analysis of the pickup acting on the oscillatory system and mixed vibration under study is possible.

Owing to the very small self-capacity of the Hall voltage producer the analysis can be carried out at up to very high frequencies and down, practically without amplitude distortion. Owing to the very small energy requirements of the Hall voltage producer a control generator with relatively small output may be used, a feature of economy in the measuring apparatus.

An electronic voice frequency generator of known construction can be used for the comparison generator. However it is possible to use a mechanical electrical transducer for this purpose such as a two pole alternator having a tachometer.

Based on the fact that the phase angle between the signal obtained by the mechanically influenced value and the control or exciter signal from the comparison generator also enters into output voltage from the Hall voltage producer, and an apparatus is readily suitable for measuring the phase angle, then, for example, if the comparison generator is provided with a phase calibrated dial, this phase dial is rotated so long or far until the Hall voltage producer reaches a maximum value. The difference in phase between the mechanically measured quantity and that of the voltage output from the comparison generator can be read from the scale of the calibrated dial.

It is often desirable in the making of measurements of oscillation to measure the phase angle between the mechanical movement of a part of a machine, say, rotary movement of a shaft, and that of its resultant vibratory motion of say a mounting carrying the shaft.

If the phase angle between the rotation movement of a machine part and another part which it sets in vibration is to be measured, such as for dynamic balancing it is oftentimes advantageous to employ a mechanically electric converter as the comparison generator, e.g., a two pole generator having a tachometer which may be coupled to the machine shaft carrying the rotary part in any convenient manner. In use of the invention the voltage produced by this mechanical converter and that representing the rotation movement, perhaps under intermediate transformation of a control element such as a thermistor, is supplied to the vibration pickup as modulating values.

By such an arrangement there is also the possibility of determining of the phase angle if the stator of the mechanical electric converter is so designed that it can be rotated during the investigation or measuring until the Hall voltage takes on a maximum value. Upon the positioning of the stator, the movement and the oscillation values can be checked against the phase angle between them.

For the measuring of the phase angle it may be preferable not to determine the resulting vector of the vibration relative to the rotation movement but to resolve it into components. This can be done, for example, by the resolution into 90° components if there are two mechanical electric generators coupled to the rotary part of the machine and the stators are mutually turnable through 90°. With this arrangement the comparison alternating current voltages derived from the comparison generator are displaced out-of-phase by 90°. If the signal of one generator is at one time led to the Hall voltage producer as control or exciter control current, and then that from the other, the 90° components of the resulting vectors of vibration may be determined.

If division into 60° or 120° components is desired, then three comparison generators of similar nature may be used as for 90° or, by means of phase-changing circuits, a single mechanical generator may be used and its output thereby split into arbitrary angular components.

Additionally, the rotary part of the machine need not be mechanically coupled with the comparison generator but a light beam acting on a photo-electric cell which beam is modulated by the rotating part may be used. This has the advantage of no load being imposed on the machine.

DRAWING

DESCRIPTION OF PREFERRED EMBODIMENTS

Figure 1:
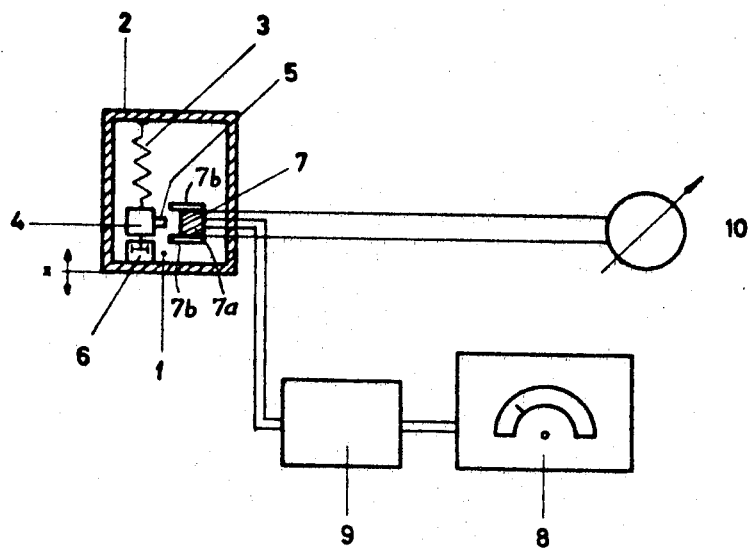
FIG. 1 is a partially diagrammatic representation of the vibration measuring instrument.

In FIG. 1, the pickup 1 includes a housing 2 to be mounted on or pushed against the vibratory object under study so as to become vibrated vertically or in the direction $x$. Within the housing is a system capable of vibration or reciprocatory oscillation including an inertia body 4 fixed on the lower end of a spring 3 attached at the upper end thereof to the housing. A magnet 5 is fixedly mounted on the body 4 and the motion of the body is damped by a damper 6. Associated with the magnet on the body is a Hall voltage producer 7, for example one as described in German Patent 1,125,666.

The Hall voltage producer or generator consists essentially of a conductor, such as a Hall leaf, 7a between two ferrite plates 7b. Vertical reciprocatory movement of the magnet 5 induces an alternating magnetic field having a vertical component in the conductor and an alternating current traverses the conductive zone in the direction perpendicular to the plane of the drawing as produced by an AC generator 8 of variable controlled frequency whose voltage output is stabilized by a stabilizer 9 because of the temperature effect in a Hall voltage producer.

In an analysis of vibration when the magnet is oscillating under influence of the tested body the comparison generator is tuned by hand or automatically to a frequency giving maximum average Hall voltage output, positive or negative, readable on meter 10. The frequency of the comparison or exciting generator is then read off its scale.

Since the polarity of Hall voltage in a conductor is essentially dependent on relative senses of flux and exciter currnt, all mutually perpendicular, reversal of both exciter current and flux does not change polarity or voltage. Thus, with the magnet 5 reciprocating vertically to induce an alternating upwardly and downwardly direction of flux in the Hall generator, and with alternating exciter current from the generator 8 of variable controlled frequency flowing perpendicular to the plane of the drawing, in-phase synchronism of the magnet movement, or rather alternations of the flux and the excited current will produce a unidirectional E.F.M., say from left to right in the conductor, of maximum magnitude to be impressed on the voltmeter 10. Although the flux and exciter current may each even pass through zero, the mechanical inertia of the meter 10 can smooth out readings to the average maximum output. Lack of such a synchronism will introduce at least some reverse E.F.M. during a cycle and lower the reading at meter 10.

Figure 2:
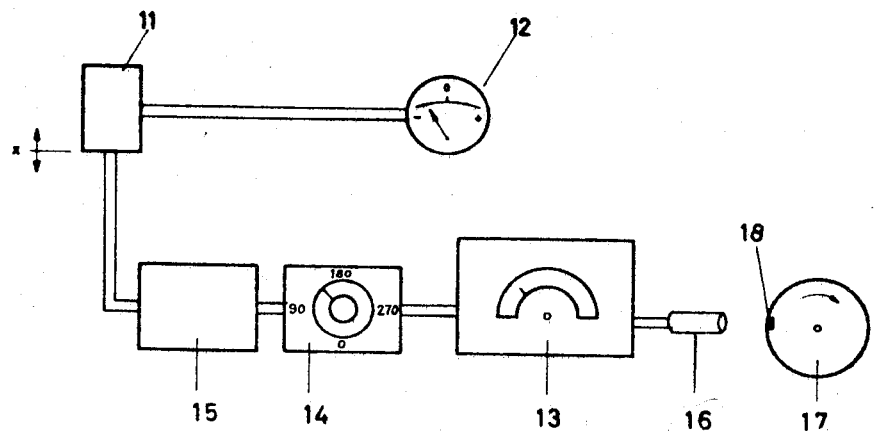
FIG. 2 shows diagrammatically the use of a phase shifter used with an electronic generator.

In FIG. 2, the pickup 11 is similar to that shown as 1 in FIG. 1 and its Hall voltage is indicated by the instrument 12. The control or exciting current is produced by an electronic comparison generator 13 which has connected to it at its output side, means to measure the phase angle as by a phase changer 14. The control voltage is held constant by a stabilizer 15. After a tuning of the generator 13 to give a maximum reading on the instrument 12, the phase shifter is adjusted until the greatest effect on the instrument 12 is reached. The phase angle between the alternating current voltage signal of the comparison generator and the mechanical part oscillating can then be read off the scale of the phase shifter.

If, for example in the case of a determination of unbalance, the phase angle between the turning movement of a rotary machine part 17 and that of forced mechanical vibration due to it has been determined, then the rotary movement, as shown in FIG. 2 can be scanned by means of a photo-electric cell or photo resistor 16 if the rotary part is provided with a contrast marking such as at 18. The impulse voltage of the photo-electric cell 16 is thus used for the phase synchronization of the comparison generator; and the phase angle between the turning movement and the set up mechanical vibration $x$ can, in turn, be measured by regulation of the phase shifter 14 to maximum reading on the meter 12.

Figure 3:
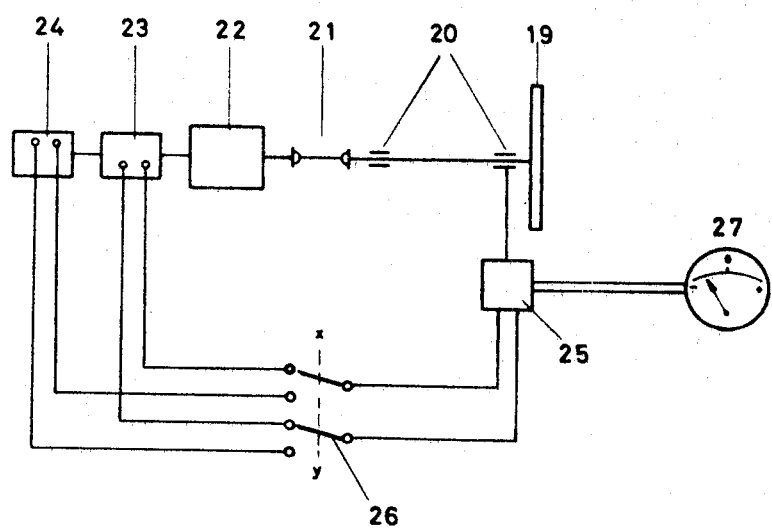
FIG. 3 shows how phase and measurements may be made relative to 90° components by employing mechanical electric generators as comparison generators.

FIG. 3 shows a measuring instrument by which, instead of the resultant vector of vibration relative to the rotation movement being determined, it is resolved into 90° components. In FIG. 3 a machine part, such as an unbalanced wheel 19 is mounted on a shaft for rotation in bearings 20 and is driven through a mechanical coupling 21 by a motor 22. On the shaft of this motor there are two AC bipole tacho-generators 23 and 24 whose fields are situated 90° apart about the axis of the shaft. A pickup device 25, as described in FIG. 1 is effectively mounted on the hearing nearer the unbalanced wheel 19. The alternating currents from generator 23 and 24 can be applied selectively, as the comparison or exciter current, via a two-way switch 26 to the pickup device 25, and the actions due to vibrational movement of the bearing reltaive to two 90° coordinate directions $x$ and $y$ as components can be read from the meter 27.

What is claimed is:

1. An apparatus for studying mechanical vibration comprising a mount for disposiition against a body whose vibration is under study, an inductive combination on the mount for converting motion of the mount into a corresponding electrical value, the combination being a Hall voltage producer having an electrically excitable conductor member and an associated magnet member, one of the members being fixed on the mount and the other being of greater mass and resiliently carried on the mount for relative reciprocatory movement of the members to induce directionally alternating flux on the conductive member in dependence on the motion in space of the mount, a selectively variable frequency electrical comparison generator of alternating current connected to the conductor member for exciting same by current flowing at right angles to the direction of said movement, and an exclusively direct current measuring instrument connected to the conductor member for measuring the Hall voltage produced in the conductor member by interaction of the excitation and the alternating flux of the magnet member relative to the conductor member, whereby when the frequency of the comparison generator is varied to become in phase with the flux on the conductor member the instrument reads maximum.

2. An apparatus as claimed in claim 1, the generator being an electronic tone-frequency generator.

3. An apparatus as claimed in claim 1 said generator being an electro-mechanical generator for converting a mechanical movement into an electrical value.

4. An apparatus as claimed in claim 1, and a calibrated phase shifter connected to the generator to vary the phase between the generator and the pickup.

5. An apparatus as claimed in claim 1 and external means for phase-synchronizing the comparison generator and the Hall voltage producer for maximum output of the latter.

6. An apparatus as claimed in claim 2, the electronic generator having in addition a source of alternating current voltage for phase synchronizing.

7. An apparatus as claimed in claim 6, said source of voltage being a mechanical generator.

8. An apparatus as claimed in claim 7, said source of voltage being one of a plurality of sources differing by a predetermined phase angle, and selective switch means for connecting one of the sources to the Hall voltage producer.

References Cited

UNITED STATES PATENTS

| | | | |
|---|---|---|---|
| 3,038,342 | 6/1962 | Hack | 73—462 |
| 3,147,624 | 9/1964 | Trimble | 73—462 |
| 3,180,136 | 4/1965 | Foster | 73—714 |
| 3,280,638 | 10/1966 | Hack | 73—462 |
| 3,286,528 | 11/1966 | Jullien-Davin | 73—398 |
| 3,336,809 | 8/1967 | Hack | 73—462 |

FOREIGN PATENTS

| | | |
|---|---|---|
| 896,261 | 5/1962 | Great Britain. |
| 947,169 | 1/1964 | Great Britain. |

RICHARD C. QUEISSER, *Primary Examiner.*

J. R. FLANAGAN, *Assistant Examiner.*